Dec. 12, 1967     J. BECKER     3,357,776
HIGH APERTURE OBJECTIVE OF THE EXTENDED GAUSS-TYPE
Filed Nov. 21, 1963
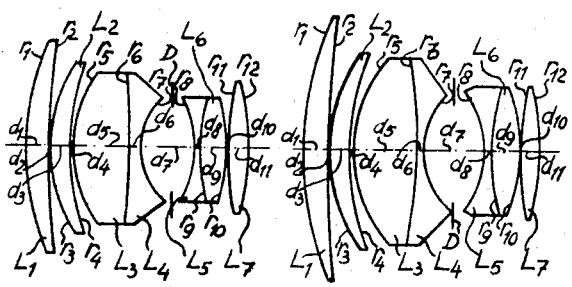
Fig. 3
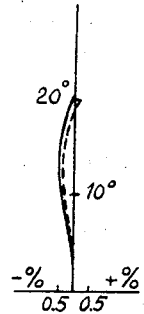
Fig. 4
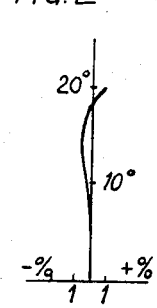
Fig. 5
Fig. 6
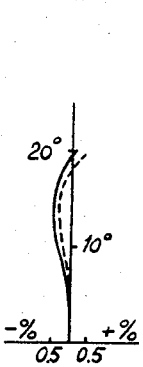
Fig. 7
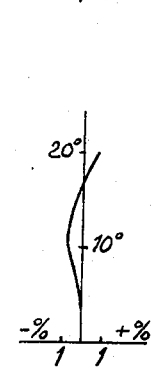
Fig. 8
INVENTOR
JOHANNES BECKER
BY
ATTORNEYS

United States Patent Office 3,357,776
Patented Dec. 12, 1967

3,357,776
HIGH APERTURE OBJECTIVE OF THE EXTENDED GAUSS-TYPE
Johannes Becker, Delft, Netherlands, assignor to N.V. Optische Industrie "De Oude Delft," Delft, Netherlands
Filed Nov. 21, 1963, Ser. No. 325,335
Claims priority, application Netherlands, Nov. 30, 1962, 286,231
2 Claims. (Cl. 350—210)

The invention relates to a high aperture objective of the extended Gauss-type which consists of seven single lenses forming five components, of which components, taken in the order from the long towards the short conjugate side of the objective, the first and second each consist of a single meniscus lens ($L_1$, $L_2$) of positive power turning its concave side towards the diaphragm; the third is a negative meniscus component positioned on the same side of the diaphragm as the first and second components with its concave side turned towards the diaphragm, and consists of a biconvex lens ($L_3$) and a biconcave lens ($L_4$); the fourth is a meniscus of weak power positioned on the opposite side of the diaphragm with its concave side turned towards the diaphragm and consists of a biconcave lens ($L_5$) and a biconvex lens ($L_6$); and the fifth is a single biconvex lens ($L_7$).

Objectives of this type having a relative aperture up to $f/1.2$ and an angular field $2\omega$ of 40° have been described in the United States patent specification 2,836,102.

My invention has for its principal object to provide an objective of the type referred to yielding a still higher aperture while maintaining a good state of correction in a flat field of approximately 40°.

In accordance with my invention, this can be achieved by observing a number of conditions in combination as follows:

$$\left.\begin{array}{l} n_1 > 1.7 \\ n_2 > 1.72 \\ n_6 > 1.72 \\ n_7 > 1.7 \end{array}\right\} \text{I}$$

$$\left.\begin{array}{l} 6r_1 > r_2 > 3r_1 \\ 1.2r_3 < r_4 < 1.75r_3 \end{array}\right\} \text{II}$$

$$0.3 > n_6 - n_5 > 0.15 \quad \text{III}$$

$$|r_{12}| < r_{11} < 1.5|r_{12}| \quad \text{IV}$$

in which $L_{\text{subscript}}$ designates the lenses and $n_{\text{subscript}}$ is the refractive index for the $d$-line of the spectrum of the lenses in the order indicated above, going from the first to the fifth component, and $r_{\text{subscript}}$ is the radius of curvature of the lens surfaces, likewise taken in the order indicated.

The conditions indicated by I and II, while allowing to increase considerably the relative aperture of the objective, appear to be especially effective for the correction of astigmatism in a flat field whereas the conditions referred to by III and IV have a particularly favorable influence on the correction of coma.

In the accompanying drawing:

FIG. 1 and FIG. 2 show two examples of objectives in accordance with my invention;

FIGS. 3–5 show aberration curves of the objective according to FIG. 1; and

FIGS. 6–8 show aberration curves of the objective according to FIG. 2.

The data of the examples illustrated in FIGS. 1 and 2 are given in the following Tables I and II, respectively. Herein $n_{\text{subscript}}$ and $r_{\text{subscript}}$ have the same meaning as indicated above; $d_{\text{subscript}}$ is the axial thickness of, or the axial distance between the lenses, and $\nu_{\text{subscript}}$ is the Abbe number of the lens materials, the subscripts in all cases increasing from the first to the fifth component.

TABLE I (FIG. 1)
[F=100; f/1.1; 2ω=40°]

| | Radius of Curvature, r | Lens Thickness or Distance, d | Refractive Index, $n_d$ | Abbe Number, $\nu$ |
|---|---|---|---|---|
| $L_1$ | $r_1 = 111.5$<br>$r_2 = 352.6$ | $d_1 = 9.515$<br>$d_2 = 0.1$ | $n_1 = 1.7201$ | $\nu_1 = 50.3$ |
| $L_2$ | $r_3 = 65.7$<br>$r_4 = 134.1$ | $d_3 = 8.545$<br>$d_4 = 0.97$ | $n_2 = 1.7342$ | $\nu_2 = 51.0$ |
| $L_3$ | $r_5 = 53.4$<br>$r_6 = -329.1$ | $d_5 = 22.8$ | $n_3 = 1.6422$ | $\nu_3 = 58.1$ |
| $L_4$ | $r_7 = 23.0$ | $d_6 = 4.175$<br>$d_7 = 22.235$ | $n_4 = 1.7184$ | $\nu_4 = 29.5$ |
| $L_5$ | $r_8 = -44.4$<br>$r_9 = 80.8$ | $d_8 = 1.8$ | $n_5 = 1.5481$ | $\nu_5 = 45.9$ |
| $L_6$ | $r_{10} = -75.4$ | $d_9 = 11.36$<br>$d_{10} = 0.1$ | $n_6 = 1.7440$ | $\nu_6 = 44.9$ |
| $L_7$ | $r_{11} = 150.4$<br>$r_{12} = -106.5$ | $d_{11} = 7.96$ | $n_7 = 1.7342$ | $\nu_7 = 51.0$ |

TABLE II (FIG. 2)
[F=100; f/0.95; 2ω=40°]

| | Radius of Curvature, r | Lens Thickness or Distance, d | Refractive index, $n_d$ | Abbe number, $\nu$ |
|---|---|---|---|---|
| $L_1$ | $r_1 = 136.1$<br>$r_2 = 482.9$ | $d_1 = 10.175$<br>$d_2 = 0.2$ | $n_1 = 1.7550$ | $\nu_1 = 53.3$ |
| $L_2$ | $r_3 = 69.8$<br>$r_4 = 105.6$ | $d_3 = 9.31$<br>$d_4 = 0.93$ | $n_2 = 1.7885$ | $\nu_2 = 50.45$ |
| $L_3$ | $r_5 = 58.1$<br>$r_6 = -215.7$ | $d_5 = 26.13$ | $n_3 = 1.6516$ | $\nu_3 = 58.5$ |
| $L_4$ | $r_7 = 29.8$ | $d_6 = 4.12$<br>$d_7 = 24.6$ | $n_4 = 1.7215$ | $\nu_4 = 29.3$ |
| $L_5$ | $r_8 = -41.1$<br>$r_9 = 92.0$ | $d_8 = 1.73$ | $n_5 = 1.5235$ | $\nu_5 = 50.9$ |
| $L_6$ | $r_{10} = -71.4$ | $d_9 = 10.57$<br>$d_{10} = 0.2$ | $n_6 = 1.7440$ | $\nu_6 = 44.9$ |
| $L_7$ | $r_{11} = 136.3$<br>$r_{12} = -105.6$ | $d_{11} = 8.24$ | $n_7 = 1.7550$ | $\nu_7 = 53.3$ |

In the tables and in FIGS. 1 and 2 the lenses are identified by $L_1 \ldots L_7$, the diaphragm by D.

The FIGS. 3, 4 and 5 illustrate in the usual manner the aberrations of the objective of FIG. 1 for the $d$-line of the spectrum, more particularly the spherical aberration and the unsatisfied amount of sine condition, the astigmatism and the distortion, respectively. In a similar way the FIGS. 6, 7 and 8 show the corresponding aberrations of the objective according to FIG. 2.

I claim:

1. A high aperture objective of the extended Gauss-type having a relative aperture greater than 1/1.2 and a field angle of substantially 40°, which consists of seven single lenses forming five components, of which components, taken in the order from the long towards the short conjugate side of the objective, the first and second each consist of a single meniscus lens ($L_1$, $L_2$) of positive power turning its concave side towards the diaphragm; the third is a negative meniscus component positioned on the same side of the diaphragm as the first and second components with its concave side turned towards the diaphragm, and consists of a biconvex lens ($L_3$) and a biconcave lens ($L_4$); the fourth is a meniscus of weak power positioned on the opposite side of the diaphragm with its concave side turned towards the diaphragm and consists of a biconcave lens ($L_5$) and a biconvex lens ($L_6$); and the fifth is a single biconvex lens ($L_7$), which objective fulfills the following conditions:

$$F = 100$$

| | Radius of Curvature, $r$ | Lens Thickness or Distance, $d$ | Refractive Index, $n_d$ | Abbe Number, $\nu$ |
|---|---|---|---|---|
| $L_1$ | $r_1 = 111.5$ | $d_1 = 9.515$ | $n_1 = 1.7201$ | $\nu_1 = 59.3$ |
| | $r_2 = 352.6$ | $d_2 = 0.1$ | | |
| $L_2$ | $r_3 = 65.7$ | $d_3 = 8.545$ | $n_2 = 1.7342$ | $\nu_2 = 51.0$ |
| | $r_4 = 104.1$ | $d_4 = 0.97$ | | |
| $L_3$ | $r_5 = 53.4$ | $d_5 = 22.8$ | $n_3 = 1.6422$ | $\nu_3 = 58.1$ |
| $L_4$ | $r_6 = -329.1$ | $d_6 = 4.175$ | $n_4 = 1.7184$ | $\nu_4 = 29.5$ |
| | $r_7 = 28.0$ | $d_7 = 22.235$ | | |
| $L_5$ | $r_8 = -44.4$ | $d_8 = 1.8$ | $n_5 = 1.5481$ | $\nu_5 = 45.9$ |
| $L_6$ | $r_9 = 80.8$ | $d_9 = 11.36$ | $n_6 = 1.7440$ | $\nu_6 = 44.9$ |
| | $r_{10} = -75.4$ | $d_{10} = 0.1$ | | |
| $L_7$ | $r_{11} = 150.4$ | $d_{11} = 7.96$ | $n_7 = 1.7342$ | $\nu_7 = 51.0$ |
| | $r_{12} = -106.5$ | | | | wherein $L_{\text{subscript}}$ designates the lenses, $r_{\text{subscript}}$ the radius of curvature of the lens surfaces, $d_{\text{subscript}}$ the lens thickness or the distance between lenses along the optical axis, $n_{\text{subscript}}$ the refractive index for the $d$-line of the spectrum of the lenses, and $\nu_{\text{subscript}}$ the Abbe-number of the lenses, all subscripts increasing from the long towards the short conjugate side of the objective.

2. A high aperture objective of the extended Gauss-type having a relative aperture greater than 1/1.2 and a field angle of substantially 40°, which consists of seven single lenses forming five components, of which components, taken in the order from the long towards the short conjugate side of the objective, the first and second each consist of a single meniscus lens ($L_1$, $L_2$) of positive power turning its concave side towards the diaphragm; the third is a negative meniscus component positioned on the same side of the diaphragm as the first and second components with its concave side turned towards the diaphragm, and consists of a biconvex lens ($L_3$) and a biconcave lens ($L_4$); the fourth is a meniscus of weak power positioned on the opposite side of the diaphragm with its concave side turned towards the diaphragm and consists of a biconcave lens ($L_5$) and a biconvex lens ($L_6$); and the fifth is a single biconvex lens ($L_7$), which objective fulfills the following conditions:

$$F = 100$$

| | Radius of Curvature, $r$ | Lens Thickness or Distance, $d$ | Refractive index, $n_d$ | Abbe number, $\nu$ |
|---|---|---|---|---|
| $L_1$ | $r_1 = 136.1$ | $d_1 = 10.175$ | $n_1 = 1.7550$ | $\nu_1 = 53.3$ |
| | $r_2 = 482.9$ | $d_2 = 0.2$ | | |
| $L_2$ | $r_3 = 69.8$ | $d_3 = 9.31$ | $n_2 = 1.7885$ | $\nu_2 = 50.45$ |
| | $r_4 = 105.6$ | $d_4 = 0.93$ | | |
| $L_3$ | $r_5 = 58.1$ | $d_5 = 26.13$ | $n_3 = 1.6516$ | $\nu_3 = 58.5$ |
| | $r_6 = -215.7$ | $d_6 = 4.12$ | $n_4 = 1.7215$ | $\nu_4 = 29.3$ |
| | $r_7 = 29.8$ | $d_7 = 24.6$ | | |
| $L_5$ | $r_8 = -41.1$ | $d_8 = 1.73$ | $n_5 = 1.5235$ | $\nu_5 = 50.9$ |
| $L_6$ | $r_9 = 92.0$ | $d_9 = 10.57$ | $n_6 = 1.7440$ | $\nu_6 = 44.9$ |
| | $r_{10} = -71.4$ | $d_{10} = 0.2$ | | |
| $L_7$ | $r_{11} = 136.1$ | $d_{11} = 8.24$ | $n_7 = 1.7550$ | $\nu_7 = 53.3$ |
| | $r_{12} = -105.6$ | | | | wherein $L_{\text{subscript}}$ designates the lenses, $r_{\text{subscript}}$ the radius of curvature of the lens surfaces, $d_{\text{subscript}}$ the lens thickness or the distance between lenses along the optical axis, $n_{\text{subscript}}$ the refractive index for the $d$-line of the spectrum of the lenses, and $\nu_{\text{subscript}}$ the Abbe-number of the lenses, all subscripts increasing from the long towards the short conjugate side of the objective.

References Cited
UNITED STATES PATENTS 2,811,082  10/1957  Werfeli _____ 88—57
2,836,102  5/1958  Ito _____ 88—57

JEWELL H. PEDERSEN, *Primary Examiner.*

J. K. CORBIN, *Assistant Examiner.*